(12) United States Patent
Hyttinen

(10) Patent No.: US 9,705,418 B2
(45) Date of Patent: Jul. 11, 2017

(54) POWER CONVERTER WITH OIL FILLED REACTORS

(71) Applicant: ABB TECHNOLOGY LTD, Zürich (CH)

(72) Inventor: Mats Hyttinen, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/893,816

(22) PCT Filed: Jun. 14, 2013

(86) PCT No.: PCT/EP2013/062367
§ 371 (c)(1),
(2) Date: Nov. 24, 2015

(87) PCT Pub. No.: WO2014/198331
PCT Pub. Date: Dec. 18, 2014

(65) Prior Publication Data
US 2016/0134200 A1   May 12, 2016

(51) Int. Cl.
*H02M 7/483* (2007.01)
*H02M 7/44* (2006.01)
*H02M 7/00* (2006.01)
*H01B 9/06* (2006.01)

(52) U.S. Cl.
CPC .............. *H02M 7/44* (2013.01); *H02M 7/003* (2013.01); *H01B 9/0694* (2013.01); *H02M 2007/4835* (2013.01)

(58) Field of Classification Search
CPC ......... H02M 2007/4835; H01B 9/0611; H01B 9/0627; H01B 9/0683; H01B 9/0688; H01B 9/0694; H01B 9/0616; H01B 9/06; H01B 9/0605; H01B 9/0677
USPC .......................................... 174/14 BH, 11 BH
See application file for complete search history.

(56) References Cited

U.S. PATENT DOCUMENTS

| | | | |
|---|---|---|---|
| 2,047,000 A | 7/1936 | Calvert | |
| 2,163,783 A * | 6/1939 | Fisher ................... | H02G 15/26 174/10 |
| 3,869,561 A * | 3/1975 | Wettre ................... | H02G 15/25 174/11 R |

(Continued)

FOREIGN PATENT DOCUMENTS

| CN | 201508748 U | 6/2010 |
|---|---|---|
| CN | 102084571 A | 6/2011 |

(Continued)

*Primary Examiner* — Harry Behm
(74) *Attorney, Agent, or Firm* — Birch, Stewart, Kolasch & Birch, LLP

(57) ABSTRACT

It is provided a power converter for transferring power between a high voltage DC connection and a high voltage AC connection. The power converter includes a power converter assembly including: a first converter arm, a first reactor, a second reactor and a second converter arm, connected serially between the positive and negative terminals of the DC connection. The high voltage AC connection is provided between the first reactor and the second reactor. Each one of the converter arms includes a plurality of converter cells and each one of the converter cells includes a switching element and an energy storage element. Both the first reactor and the second reactor are oil filled reactors.

13 Claims, 3 Drawing Sheets

(56) References Cited

U.S. PATENT DOCUMENTS

| | | | |
|---|---|---|---|
| 4,225,746 A * | 9/1980 | Ball | H02G 15/24 174/21 R |
| 6,815,608 B2 * | 11/2004 | Sato | H01J 37/248 174/11 BH |
| 8,228,153 B2 | 7/2012 | Ceretta | |
| 2011/0103116 A1 * | 5/2011 | Asplund | H02J 3/36 363/131 |
| 2013/0003299 A1 * | 1/2013 | Wissner | H02M 7/003 361/695 |

FOREIGN PATENT DOCUMENTS

| | | | |
|---|---|---|---|
| CN | 102227094 A | 10/2011 | |
| FR | 1.382.853 A | 12/1964 | |
| JP | 55-138812 A | 10/1980 | |
| WO | WO 2008/034271 A2 | 3/2008 | |
| WO | WO 2009/149755 A1 | 12/2009 | |
| WO | WO 2012/098107 A2 | 7/2012 | |
| WO | WO 2013/037400 A1 | 3/2013 | |

* cited by examiner

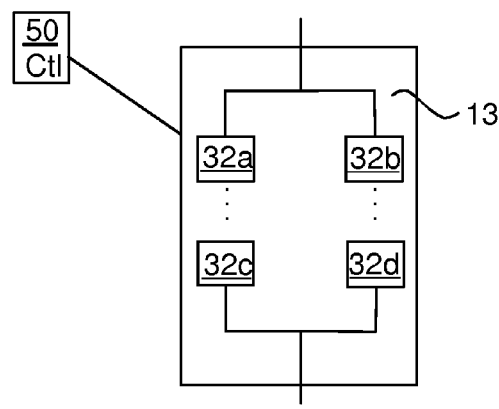
Fig. 6
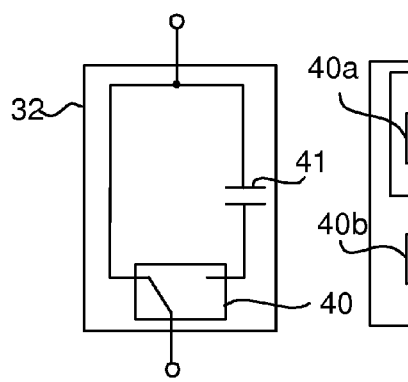 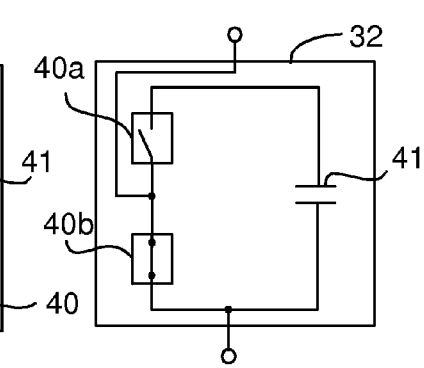 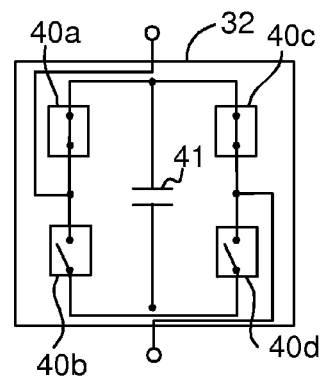
Fig. 7A    Fig. 7B    Fig. 7C

POWER CONVERTER WITH OIL FILLED REACTORS

TECHNICAL FIELD

The invention relates to a power converter for transferring power between a high voltage DC connection and a high voltage AC connection.

BACKGROUND

In HVDC (High Voltage Direct Current) applications, power converters are used for converting between the AC (Alternating Current) grid and DC (Direct Current).

The power converters are typically provided with reactors on the AC side, partly as an integral part of the power converter and also to act as filters for providing a suitable AC waveform. However, the reactors for high voltage applications occupy a lot of space. Moreover, the size severely restricts where the reactors can be placed, leading to inflexible installation topologies.

SUMMARY

It is an object to provide a power converter with small reactors.

According to a first aspect, it is provided a power converter for transferring power between a high voltage DC connection and a high voltage AC connection. The power converter comprises a power converter assembly comprising: a first converter arm, a first reactor, a second reactor and a second converter arm, connected serially between the positive and negative terminals of the DC connection. The high voltage AC connection is provided between the first converter arm and the second converter arm. Each one of the converter arms comprises a plurality of converter cells and each one of the converter cells comprises a switching element and an energy storage element. Both the first reactor and the second reactor are oil filled reactors.

The use of converter arms with converter cells, also known as multilevel converter, allows for individual control of each one of the converter cells, whereby each switching results in a relatively small voltage steps on the AC connection, compared to having a single switch (such as a thyristor) replacing the respective converter arms. The reduced voltage differences makes the multilevel converter structure tolerate greater stray capacitances in the reactors. This allows the use of oil filled reactors, which are significantly smaller than corresponding air filled reactors.

The reduced size is of great importance, e.g. for off-shore applications where space is especially limited. Furthermore, the small size of oil filled reactors allows for a more flexible installation, since the reactor can be placed in a variety of locations. Moreover, the installation with oil filled reactors is safer for operators, since high voltage in air is essentially avoided.

The AC connection may comprise a conductor provided within an outer enclosure with an open end, allowing an oil filled AC connection when the AC connection is connected. The open end may form part of a bushing. Such an embodiment allows an oil filled connection to external components such as switchgear or a transformer, which further increases safety.

The power converter may further comprise a DC side capacitor serially arranged between the positive and negative terminals of the DC connection.

The converter cells may be full bridge converter cells.

The converter cells may be half bridge converter cells.

Optionally, the converter cells could be of any other type of cells forming part of a multilevel bridge configuration.

Both the first reactor and the second reactor may be provided with an iron core. The iron core increases efficiency and reduces surrounding magnetic fields.

The power converter may comprise three power converter assemblies for connection between a common high voltage DC connection and a three phase high voltage AC connection. This implements a three phase power converter.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 6 is a schematic diagram illustrating possible converter cell arrangements of converter arms of FIG. 3; and FIGS. 7A-C are schematic diagrams illustrating embodiments of converter cells of the converter arm of FIG. 6.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
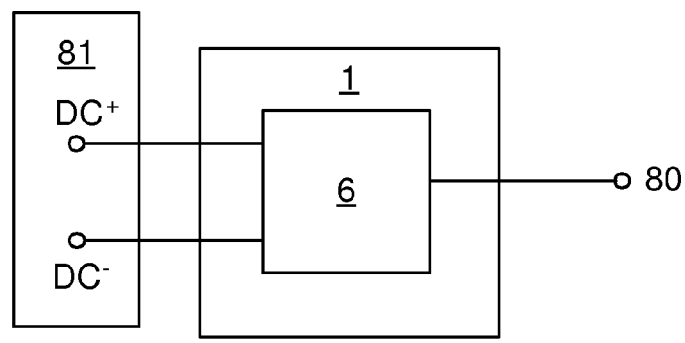
FIG. 1 is a schematic diagram of a single phase power converter for converting power between DC and AC.

FIG. 1 is a schematic diagram of a power converter 1 for converting power between DC and AC. The power converter 1 converts power in either direction between a high voltage DC connection 81 and a high voltage AC connection 80. The DC connection 81 comprises a positive terminal DC+ and a negative terminal DC. The AC connection 80 comprises a phase terminal AC. A ground terminal may also be provided (not shown). Power can flow from DC to AC or vice versa. The power converter 1 comprises a power converter assembly 6 which performs the actual power conversion. This division between the power converter 1 and the power converter assembly 6 does not need to be represented by different physical objects, whereby the power converter 1 and the power converter assembly 6 can in practice be the same device.

With regards to voltage, positive and negative are here to be interpreted as mutually relative terms and not absolute. In other words, the positive connection DC+ of the DC connection 81 has a higher voltage than the negative terminal DC− of the DC connection 81. Hence, for example, the positive terminal or the negative terminal could be at ground potential. In such case, one of the DC connections could be replaced with a ground connection, thereby providing a monopole system.

Figure 2:
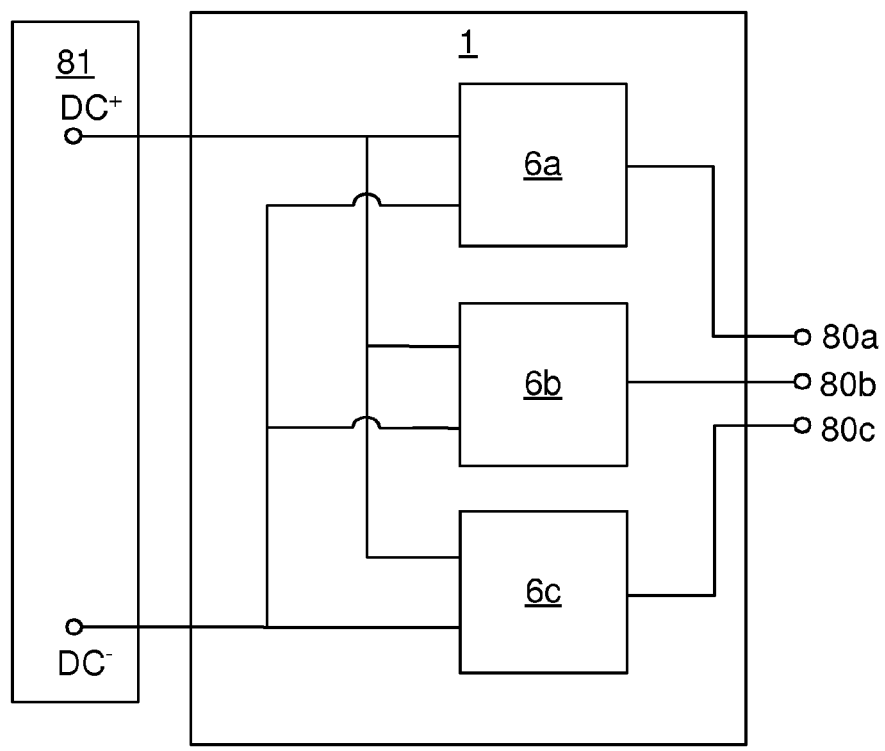
FIG. 2 is a schematic diagram of a three phase power converter for converting power between DC and AC.

FIG. 2 is a schematic diagram of a three phase power converter 1 for converting power between DC and AC. The three phase power converter 1 here comprises three power converter assemblies 6a-c. In this way, the AC connection here comprises three phase terminals 80a, 80b and 80c to be able to provide a three phase connection, e.g. to an AC grid, an AC power source or an AC power load. Optionally, an AC ground terminal is also provided (not shown). A corresponding multiphase power converter can be achieved for other than three phases by connecting the same number of power converter assemblies as there are phases. In this way, multiphase power converters for any suitable number of phases, such as two, four, five, six, etc., phases can be provided.

Figure 3:
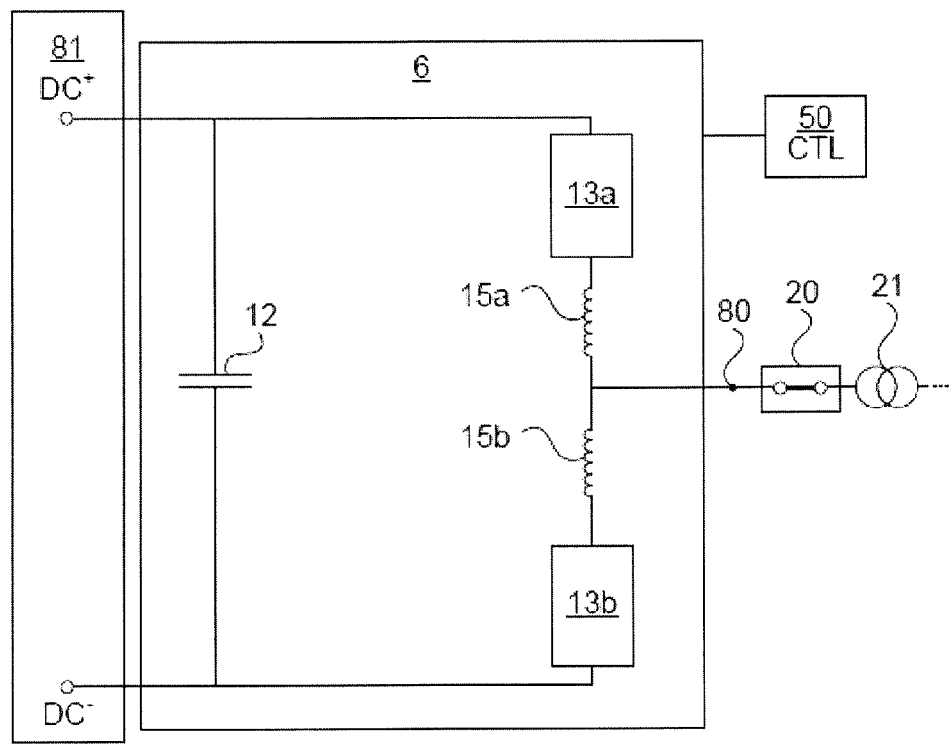
FIG. 3 is a schematic diagram illustrating an embodiment of the power converter assemblies of FIGS. 1 and 2, represented by a single power converter assembly.

FIG. 3 is a schematic diagram illustrating an embodiment of the power converter assemblies 6, 6a-c of FIGS. 1 and 2, represented here by a single power converter assembly 6. The power converter assembly 6 comprises a first converter arm 13a, a first reactor 15a, a second reactor 15b and a second converter arm 13b, connected serially between the positive and negative terminals DC+, DC− of the DC connection 81. While the reactors 15a-b are here shown as being provided on the inner side of the converter arms 13a-b, the reactors could alternatively or additionally be provided between the converter arms 13a-b and the respective DC terminals DC+, DC− of the DC connection 81. The reactors 15a-b act as filters to provide a sufficiently sinusoidal (or square, saw tooth shaped, etc.) waveform on the AC connection 80. The reactors 15a-b are optionally provided with an iron core. The iron core increases efficiency and reduced any surrounding magnetic field.

The AC connection 80 is provided between the first converter arm 13a and the second converter arm 13b. With the placement of the first reactor 15a and the second reactor 15b between the first converter arm 13a and the second converter arm 13b as shown in FIG. 3, the AC connection 80 is provided between the first reactor 15a and the second reactor 15b.

A DC side capacitor 12 is optionally arranged between the positive and negative DC terminals, DC+ and DC− to allow an AC current to circulate with minimal effect. Optionally, when a multiphase power converter 1 such as the one shown in FIG. 2 is used, the DC side capacitor 12 can be omitted, since an AC current can circulate between the DC sides of the converter assemblies various phases.

The power converter assembly is a multilevel converter, whereby each one of the converter arms 13a-b comprises a plurality of converter cells. The converter cells can be individually controlled to achieve a finer granularity in the conversion, e.g. to achieve a more sinusoidal (or square, saw tooth shaped, etc.) power conversion. Moreover, by individual control of each one of the converter cells, each switching results in a relatively small voltage difference on the AC connection, compared to having a single switch (such as a thyristor) replacing the respective converter arms 13a-b. Since each switching results in a smaller voltage difference on the AC connection, the impact of stray capacitances in the reactors 15a-b is greatly reduced, compared to the single switch situation. This reduced sensitivity to stray capacitances is exploited in embodiments presented herein by providing reactors 15a-b which are oil filled. Oil filled reactors 15a-b implies higher stray inductances than air filled reactors, but this is acceptable when implemented as part of a multilevel converter which is less sensitive to stray inductances.

Implementing the reactors 15a-b as oil filled reactors significantly reduces the size of the reactors 15a-b compared to air filled reactors, since the dielectric constant for oil is greater. The oil can e.g. be a mineral oil, a silicone oil, a castor oil or a synthetic ester oil, as long as a sufficiently high dielectric constant is achieved. Alternatively, the reactors can be filled with another suitable dielectric fluid or gas, such as sulphur hexafluoride (SF6) or octafluorocyclobutane (R-C318) or even a dielectric solid, such as epoxy.

The reduced size is of great importance, e.g. for off-shore applications where space is especially limited. Furthermore, the small size of oil filled reactor allows for a more flexible installation, since the reactor can be placed in a variety of locations. Moreover, the installation with oil filled reactors is safer for operators, since high voltage in air is essentially avoided.

A controller 50 controls the operation of the converter arms 13a-b. The controller 50 can be a single controller or divided into a central controller and local controllers for each converter arm 13a-b and/or converter cell. While the controller 50 is here shown provided externally from the power converter assembly, part or all of the controller 50 may also be provided as part of the power converter assembly 6.

The embodiment shown of the power converter assembly of FIG. 3 is only an example and the principles presented herein can be applied to any type of suitable power converter assemblies using converter cells, e.g. included in converter arms. For example, power converter assemblies where converter cells for the various phases are connected serially between the DC terminals can be used, or shunt and series hybrid converters (comprising both converter cells and switches separate from converter cells).

The AC connector 80 is connected to external components, e.g. a transformer 21, optionally via a switchgear 20. Due to the oil filled reactors 15a-b, the switchgear can e.g. be a gas insulated switchgear (GIS). With air filled reactors, since there is high voltage exposed to air, such a connection is not as flexible and significantly more difficult to implement.

Figure 4:
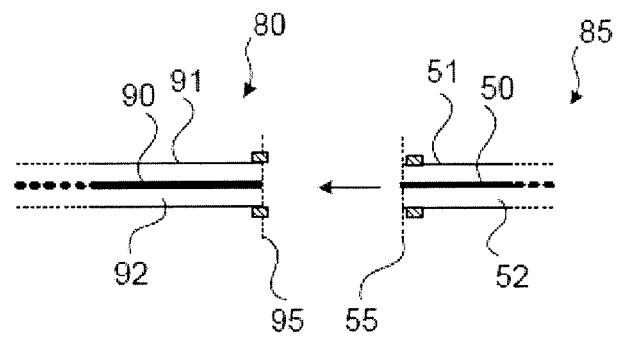
FIG. 4 is a schematic longitudinal view through an embodiment of the AC connection of FIG. 3.

FIG. 4 is a schematic longitudinal view through an embodiment of the AC connection 80 of FIG. 3. The AC connection 80 comprises a conductor 90 provided within an outer enclosure 91 with an open end 95. A space 92 is thus provided between the conductor 90 and the outer enclosure 91. The open end 95 can form part of a bushing.

The AC connection 80 can be connected with a corresponding connector 85, e.g. to connect to a switchgear or transformer. The corresponding connector 85 comprises an outer enclosure 51, a conductor 50 and an open end 55. The open end 55 may form part of a bushing which allows connection with the corresponding open end 95 of the AC connection 80. Hence, when the AC connection 80 is connected to the corresponding connector 85, the two conductors 90, 50 are brought into galvanic contact with each other and the outer enclosures 91, 51 are connected, sealing the spaces 92, 52. In this way, when connected, the spaces 92, 52 between the conductors 90, 50 and the outer enclosures 91, 51 can be filled with oil, or other suitable dielectric fluid or gas.

Figure 5:
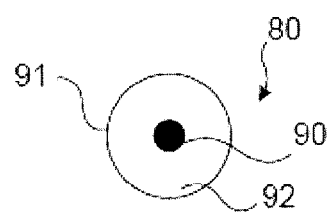
FIG. 5 is a schematic cross-section of an embodiment of the AC connection of FIG. 3.

FIG. 5 is a schematic cross-section of an embodiment of the AC connection 80 of FIG. 3. Here, it can be seen how the enclosure 91 is provided such that there is space 92 all around the conductor 90 which can be filled with a fluid or gas dielectric, such as oil.

FIG. 6 is a schematic diagram illustrating possible converter cell arrangements of converter arms of FIG. 3. FIG. 6 illustrates the structure of any one of the converter arms 13a-b, here represented by a single converter arm 13. The converter arm 13 is a multi level converter and comprises a plurality of converter cells 32a-d, wherein each converter cell 32a-d is controlled by the controller 50.

The converter cells 32a-d can be connected in series to increase voltage rating or in parallel to increase current rating. The serially connected converter cells 32a-d can be individually controlled to achieve a finer granularity in the conversion, e.g. to achieve a more sinusoidal (or square, saw tooth shaped, etc.) power conversion. Also, by controlling the serially connected converter cells in this way, the switching frequency of each converter cell is relatively low, which results in low switching losses when compared to higher switching frequencies. While the converter arm 13 is here illustrated to have four converter cells 32a-d, any number of converter cells is possible, including one, two, three or more. In one embodiment, the number of converter cells in each converter arm 13 is in the range from 30 to 1000 converter cells.

FIGS. 7A-C are schematic diagrams illustrating embodiments of converter cells 32a-d of the converter arm of FIG. 6. It is to be noted that the embodiments of FIGS. 7A-C are only examples and converter cells of any suitable structure of converter cells forming part of a multilevel bridge configuration could be used.

Any one of the converter cells 32a-d is here represented as a single converter cell 32. A converter cell 32 is a combination of one or more semiconductor switching elements, such as transistors or thyristors, and one or more energy storing elements 41, such as capacitors, supercapacitors, inductors, batteries, etc. Optionally, a converter cell 32 can be a multilevel converter structure in itself, such as a flying capacitor or MPC (Multi-Point-Clamped) or ANPC (Active—Neutral-Point-Clamped) multilevel structure.

FIG. 7A illustrates a converter cell comprising a switching element 40 and an energy storage element 41 in the form of a capacitor. The switching element 40 can for example be implemented using an insulated gate bipolar transistor (IGBT), Integrated Gate-Commutated Thyristor (IGCT), a Gate Turn-Off thyristor (GTO), or any other suitable high power semiconductor component. In fact, the converter cell 32 of FIG. 7A can be considered to be to be a more general representation of the converter cell shown in FIG. 7B, which will be described here next.

FIG. 7B illustrates a converter cell 32 implementing a half bridge structure. The converter cell 32 here comprises a leg of two serially switching elements 40a-b, e.g. in the form of IGBTs, IGCTs, GTOs, etc. Optionally, there is an antiparallel diode connected across each switching element 40a-b (not shown). An energy storage element 41 is also provided in parallel with the leg of switching elements 40a-b. The voltage synthesised by the converter cell 32 can thus either be zero or the voltage of the energy storage element 41.

FIG. 7C illustrates a converter cell 32 implementing a full bridge structure. The converter cell 32 here comprises four switching elements 40a-d, e.g. IGBTs, IGCTs, GTOs, etc. Optionally, there is an antiparallel diode connected across each switching element 40a-d (not shown). An energy storage element 41 is also provided in parallel across a first leg of two switching elements 40a-b and a second leg of two switching elements 40c-d. Compared to the half bridge of FIG. 7B, the full bridge structure allows the synthesis of a voltage capable of assuming both signs, whereby the voltage of the converter cell can either be zero, the voltage of the energy storage element 41, or a reversed voltage of the energy storage element 41.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A power converter for transferring power between a high voltage DC connection and a high voltage AC connection, the power converter comprising a power converter assembly comprising:
    a first converter arm;
    a first reactor;
    a second reactor; and
    a second converter arm,
    wherein the first converter arm, the first reactor, the second reactor and the second converter arm are connected serially between positive and negative terminals of the DC connection,
    wherein the high voltage AC connection is provided between the first converter arm and the second converter arm,
    wherein each one of the first and second converter arms comprises a plurality of converter cells and each one of the converter cells comprises a switching element and an energy storage element,
    wherein both the first reactor and the second reactor are oil filled reactors placed between the first converter arm and the second converter arm and configured to act as filters to provide a sufficiently sinusoidal waveform on the AC connection, and
    wherein the AC connection is provided between the first reactor and the second reactor and comprises a conductor provided within an outer enclosure with an open end, allowing an oil filled AC connection when the AC connection is connected, a space is provided between the conductor and the outer enclosure to be filled with oil, and the space at the open end of the AC connection is not sealed when the AC connection is not connected,
    wherein the AC connection is connectable to a corresponding connector comprising an outer enclosure, a conductor, an open end, and a space provided between the conductor and the outer enclosure to be filled with oil or gas, said open end forming part of a bushing for allowing connection with the open end of the AC connection, thereby sealing the space of the AC connection and the space of the corresponding connector, bringing the conductor of the AC connection and the conductor of the corresponding connector in galvanic contact with each other, and connecting the outer enclosure of the AC connection and the outer enclosure of the corresponding connector when the AC connection is connected to the corresponding connector.

2. The power converter according to claim 1, further comprising a DC side capacitor serially arranged between the positive and negative terminals of the DC connection.

3. The power converter according to claim 2, wherein the converter cells are full bridge converter cells.

4. The power converter according to claim 2, wherein the converter cells are half bridge converter cells.

5. The power converter according to claim 2, wherein both the first reactor and the second reactor are provided with an iron core.

6. The power converter according to claim 1, wherein the converter cells are full bridge converter cells.

7. The power converter according to claim 1, wherein the converter cells are half bridge converter cells.

8. The power converter according to claim 1, wherein both the first reactor and the second reactor are provided with an iron core.

9. The power converter according to claim 1, comprising three of the power converter assemblies for connection between a common high voltage DC connection and a three phase high voltage AC connection.

10. The power converter according to claim 1, further comprising a DC side capacitor serially arranged between the positive and negative terminals of the DC connection.

11. The power converter according to claim 1, wherein the converter cells are full bridge converter cells.

12. The power converter according to claim 1, wherein the converter cells are half bridge converter cells.

13. The power converter according to claim 1, wherein both the first reactor and the second reactor are provided with an iron core.

* * * * *